United States Patent [19]
Ishikawa et al.

[11] Patent Number: 4,820,743
[45] Date of Patent: Apr. 11, 1989

[54] POLYMER/POLYOL COMPOSITION, PROCESSES FOR MAKING THE SAME AND POLYURETHANE THEREFROM

[75] Inventors: Isao Ishikawa, Ohtsu; Tsuyoshi Tomosada, Kyoto, both of Japan

[73] Assignee: Sanyo Chemical Industries, Ltd., Kyoto, Japan

[21] Appl. No.: 130,656

[22] Filed: Dec. 9, 1987

[30] Foreign Application Priority Data

Dec. 9, 1986 [JP]  Japan .................. 61-292836

[51] Int. Cl.$^4$ ........................................... C08G 18/14
[52] U.S. Cl. ..................... 521/137; 524/714; 524/717; 524/718; 524/722; 525/185
[58] Field of Search .............. 524/714, 717, 718, 722; 521/137; 525/185

[56] References Cited

U.S. PATENT DOCUMENTS 4,683,272  7/1987  Cuscurida et al. ............... 525/404

*Primary Examiner*—Maurice I. Welsh
*Attorney, Agent, or Firm*—Oblon, Fisher, Spivak, McClelland & Maier

[57] ABSTRACT

Polymer/polyol compositions, obtained by polymerizing one or more ethylenically unsaturated monomers in situ in a blend of a polyether polyol and a polyamine, are of suitably high reactivity. The polymer/polyol compositions provide, by reaction with a polyisocyanate, polyurethanes having improved moldability and physical properties along with self-mold-release characteristics, and are particularly suitable for producing polyurethane by RIM process.

20 Claims, 1 Drawing Sheet

FIG. 1

POLYMER/POLYOL COMPOSITION, PROCESSES FOR MAKING THE SAME AND POLYURETHANE THEREFROM

BACKGROUND OF THE INVENTION

1. Field of the Invention

This invention relates to modified polyols or polymer/polyol compositions that are suitable for producing polyurethanes, particularly those by so-called "reaction injection molding" (RIM) process. The invention also relates to novel methods for making such compositions and to methods for making polyurethanes therefrom.

2. Description of the Prior Art:

It is known to produce polyurethanes by reaction injection molding or RIM systems, such as ones using, as the active hydrogen atom-containing component, polyether polyol and a chain-extender such as an aromatic polyamine. (JPN Lay-open Pat. No. 142797/1977, and No. 74325/1982, corresponding to British Pat. No. 1,534,258, and U.S. Pat. No. 4,296,212, respectively.) This process has drawbacks that molding conditions are restricted because of too high reactivity of aromatic polyamines, and that it is necessary to introduce the reaction mixture into a mold within a short time using a high delivery RIM machine.

SUMMARY OF THE INVENTION

It is an object of the present invention to provide polymer/polyol compositions, which are of high reactivity suitable for producing polyurethanes.

It is another object of this invention to provide a process for producing such polymer/polyol compositions.

It is still another object of the invention to provide polyurethanes by RIM process, with improved reactivity and moldability.

It is yet another object of the invention to provide a process for producing polyurethanes having improved physical properties along with self-mold-release characteristics.

Briefly, these and other objects of the present invention as hereinafter will become more readily apparent have been attained broadly by providing a polymer/polyol composition, formed in situ in a blend of a polyether polyol and a polyamine from polymerizable one or more ethylenically unsaturated monomers, which composition are convertible by reaction with polyisocyanates to polyurethanes.

The invention also relates to a process for making the above-mentioned compositions, and a process for making polyurethane products, including elastomers and foams.

DETAILED DESCRIPTION OF THE PREFERRED EMBODIMENTS

The polymer/polyol composition according to the invention, can be formed, in situ in a blend of at least one polyol (i) and at least one polyamine (ii), from one or more ethylenically unsaturated monomers (iii).

As the polyamine (ii) used for producing the polymer/polyol composition, preferred are aromatic ones. Suitable aromatic polyamines include those represented by the following general formula (1)-(4):

In the formula (1)-(4), R represents H, alkyl groups (for example, $C_1$-$C_4$ alkyl groups, such as methyl, ethyl, n- and i-propyl and butyl), electron attractive groups (for instance, halogens, such as Cl, Br, I and F; alkoxy groups, such as methoxy and ethoxy; nitro group, and the like), and combinations of two or more of them; n is an integer of 1–3; X represents direct link (bond joining the two aromatic rings) or a divalent group, for instance $C_1$-$C_{10}$ alkylene (for example $C_1$-$C_4$ alkylene, such as thio (—S—), polythio (such as —S—S—), seleno, polyseleno, telluro and polytelluro groups; m is 0 or positive integer (for instance, 0.1–1 or more); Y represents a trivalent aliphatic hydrocarbon groups (such as Plural R may be the same or different.

Illustrative examples of suitable polyamines are as follows:

(1) aromatic polyamines, having one or more alkyl substituents on the aromatic nucleus:

1,3-dimethyl-2,4-diaminobenzene, 1,3-diethyl-2,4-diaminobenzene, 1,3-dimethyl-2,6-diaminobenzene, 1,4-diethyl-2,6-diaminobenzene, 1,4-diethyl-2,5-diaminobenzene, 1,4-diisopropyl-2,5-diaminobenzene, 1,4-dibutyl-2,5-diaminobenzene, 2,4-diaminomesitylene, 1,3,5-triethyl-2,4-diaminobenzene, 1,3,5-triisopropyl-2,4-diaminobenzene, diethyltolylenediamines (1-methyl-3,5-diethyl-2,4-diaminobenzene, 1-methyl-3,5-diethyl-2,6-diaminobenzene, and mixtures of various ratio of these isomers), 2,4- and 2,6-diaminotoluene, and the like; 2,3-dimethyl-1,4-diaminophthalene, 2,6-dimethyl-1,5-diaminophthalene, 2,6-diisopropyl-1,5-diaminophthalene, 2,6-dibutyl-1,5-diaminophthalene, and the like; 3,3′,5,5′-tetramethyl-benzidine, 3,3′,5,5′-tetraisopropyl-benzidine, and the like; 3,3′,5,5′-tetramethyl-4,4′-diaminodiphenylmethane, 3,3′,5,5′-tetraethyl-4,4′-diaminodiphenylmethane, 3,3′,5,5′-tetraisopropyl-4,4′-diaminodiphenylmethane, 3,3′,5,5′-tetrabutyl-4,4′-diaminodiphenylmethane, 3,5-diethyl-3′-methyl-2′,4-diaminodiphenylmethane, 3,5-dip-3′-methyl-2′4-diaminodiphenylmethane, 3,3′-diethyl-2,2′-diaminodiphenylmethane, 4,4′-diamino-3,3′-dimethyldiphenylmethane, and the like; 3,3′,5,5′-tetraethyl-4,4′-diaminobenzophenone, 3,3′,5,5′-tetraethyl-4,4′-diaminodiphenylether, 3,3′,5,5′-tetraisopropyl-4,4′-diaminodiphenylsulfone, and the like.

(2) aromatic polyamines, free from any substituents on the aromatic nucleus: 1,2-, 1,3- and 1,4-phenylenediamines; naphthylene-1,5-diamine; 2,4′- and 4,4′-diaminodiphenylmethanes; polyphenylpolymethylenepolyamines aniline-formaldehyde condensates: represented by the formula (3), wherein m is 0.1–0.7, X is methylene and R is H]; triphenylmethane-4,4′,4″-triamine, bis(4-aminophenyl)sulfide, bis(4-aminophenyl)telluride, bis(4-aminophenyl)selenide, and so on.

(3) aromatic polyamines, having one or more electron attractive substituents on the aromatic nucleus: 2-chloro-1,4-phenylenediamine, 3-amino-4-chloroaniline, 4-bromo-1,4-phenylenediamine, 2,5-dichloro-1,4-phenylenediamine, 5-nitro-1,3-phenylenediamine, 3-dimethoxy-4-aminoaniline, 4,4′-diamino-3,3′-dimethyl-5,5′-dibromodiphenylmathane, methylene-bis(o-chloroaniline), 3,3′-dichlorobenzidine, 3,3′-dimethoxybenzidine, bis(4-amino-3-chlorophenyl)oxide, bis(4-amino-2-chlorphenyl) propane, bis(4-amino-2-chlorophenyl)sulfone, bis(4-amino-3-methoxyphenyl)decane, bis(4-amino-3-methoxyphenyl) disulfide, 4,4′-methylene-bis(2-iodoaniline), 4,4′-methylene-bis(2-bromoaniline), 4,4′-methylene-bis(2-fluoroaniline), 4-aminophenyl-2-chloroaniline, and the like.

There may be used secondary amino group-containing aromatic polyamines [the above-mentioned aromatic polyamines of the formula (1)–(4), at least a part of —NH$_2$ of which is substituted with —NH—R′ (wherein R′ represents alkyl groups, for example, lower alkyl, such as methyl, ethyl and the like)], for instance 4,4′-di(methylamino) diphenylmethane, 1-methyl-2-methyl-amino-4-aminobenzene, and the like.

Among these aromatic polyamines, preferred are (1), (2), combinations of (1) and (2), and combinations of these [(1) and/or (2)] and (3) [the weight ratio: for example, 100:0–20:80, preferably 100:0–50:50].

Among (1), preferred are aromatic diamines having at least one alkyl substituent in the ortho-position to one amino group and two alkyl substituents each containing 1 to 3 carbon atoms in the ortho-positions to the other amino groups, which diamines are preferably liquid or dissolved. Preferable examples of such diamines include: 1,3-diethyl-2,4-diaminobenzene, 2,4-diaminomesitylene, diethyltolylenediamines, 1,3,5-triethyl-2,6-diaminobenzene, 2,4- and/or 2,6-diaminotoluene, 3,3′,5,5′-tetraethyl-4,4′-di-aminodiphenylmethane, and 3,3′,5,5′-tetraisopropyl-4,4′-diaminodiphenylmethane. The most preferred are diethyltolylenediamines (particularly mixture of about 80% of 2,4-isomer and about 20% of 2,6-isomer, and mixture of about 65% of 2,4-isomer and about 35% of 2,6-isomer), and 3,3′,5,5′-tetraisopropyl-4,4′-diaminodiphenylmethane. Among (2), preferred are 1,3- and/or 1,4-phenylenediamine, and 4,4′-diaminodiphenylmethane. Among (3), preferred is 2-chloro-1,4-phenylenediamine.

In stead of or in addition to aromatic polyamines, there may be used other polyamines. Examples of such polyamines are: aliphatic polyamines, containing 2–8 carbon atoms, including alkylene($C_2$–$C_6$) diamines, such as ethylene diamine, tetramethylene diamine, hexamethylene diamine, trimethylhexamethylene diamines and the like, polyalkylene($C_2$–$C_6$) polyamines, such as diethylene triamine, iminobispropylamine, bis(hexamethylene) triamine, triethylene tetramine, tetraethylene pentamine, pentaethylene hexamine and the like, and alkyl ($C_1$–$C_4$)-substituted products of these amines, such as dialkyl($C_1$–$C_3$)amino-propyl amine, methyliminobispropylamine and the like; alicyclic or heterocyclic ring-containing aliphatic polyamines, such as 3,9-bis(3-amino-propyl)-2,4,8,10-tetraoxaspiro(5,5)undecane and the like; alicyclic or heterocyclic polyamines, containing 4–15 carbon atoms, such as menthane diamine, piperazine, N-aminoethyl-piperazine, cyclohexylene diamines (such as 1,3-diamino-cyclohexane), isophorone diamine, dicyclohexylmethane diamine and the like; araliphatic poly-amines, containing 8–15 carbon atoms, such as xylylene diamines, tetrachloro p-xylylene diamine and the like; polyamide polyamines, such as condensation products of amines as above with polymerized fatty acids (such as dimer acid); polyether polyamines, described below as high molecular weight active hydrogen atom-containing compounds; dicyandiamides; and so on.

Suitable polyols employed for producing polymer/-polyol compositions according to this invention include, for example, polyether polyols, polyester polyols, and mixtures of them, both of which polyols are usually used as raw materials for producing polyurethanes.

Illustrative of such polyether polyols are alkylene oxide adducts of compounds containing at least two (preferably two to eight) active hydrogen atoms [such as polyhydric alcohols, polyhydric phenols, amines, polycarboxylic acids, phosphorus acids and the like] and mixtures of two or more of such adducts.

Suitable examples of polyhydric alcohols include diols, for example, alkylene glycols, such as ethylene glycol, propylene glycol, 1,3- and 1,4-butane diols, 1,6-hexane diol, neopentyl glycol, diethylene glycol and the like, and cyclic group-containing diols, as written in JPN Patent Publication No. 1474/1970, such as bis(hydroxymethyl) cyclohexane, bis(hydroxyethyl)benzene, and the like; trihydric alcohols, such as glycerol, trimethylolpropane, trimethylolethane, hexane triol, triethanol amine, and the like; tetrahydric alcohols, such as pentaerythritol, alpha-methylglucoside, diglycerol, and the like; and polyols having higher functionality (5–8 or higher), for example, sugar alcohols, including pentitols (such as adnitol, arabitol and xylitol) and hexitols (such as sorbitol, mannitol, iditol, talitol and dulcitol), saccharides, including monosaccharides (such as glucose, mannose, fructose, galactose, allose, altrose, talose, gulose, idose, sorbose, psicose and tagatose), di- or oligo-saccharides (such as sucrose, trehalose, cellobiose, lactose and raffinose), glycosides, such as glucosides of polyols (for instance, glycols, such as ethylene glycol and propylene glycols, alkane polyols, such as glycerol, trimethylolpropane, hexane triol and pentaerythritol), poly(alkane polyol)s (polyglycerols, such as triglycerol and tetraglycerol, and polypentaerythritols, such as dipentaerythritol and tripentaerithritol), and cycloalkane polyols [such as tetrakis(hydroxymethyl) cyclohexanol].

Exemplary of suitable polyhydric phenols are mononuclear phenols, such as hydroquinone, catechol, resorcin, pyrogallol and phloroglucinol, and polynuclear phenols, for example, bisphenols, such as bisphenol A, bisphenol F, bisphenol sulfon and the like, as well as phenol-formaldehyde condensation products (novolaks), such as polyphenols as disclosed in U.S. Pat. No. 3,265,641.

Suitable amines are inclusive of ammonia; alkanol amines, such as mono-, di- and tri-ethanol amines and isopropanol amines, and aminoethylethanolamine and the like; aliphatic, aromatic, araliphatic and alicyclic monoamines, for example, $C_1$-$C_{20}$ alkyl amines (such as methyl, ethyl, isopropyl, butyl, octyl and lauryl amines, and the like), aniline, toluidine, naphthyl amines, benzyl amine, cyclohexyl amine and the like; aliphatic, aromatic, araliphatic and alicyclic polyamines, such as $C_2$-$C_6$ alkylene diamines (such as ethylene diamine, propylene diamine, hexamethylene diamine and the like), polyalkylene polyamines (such as diethylene triamine, triethylene tetramine and the like), aromatic diamines (such as tolylene diamines, phenylene diamines, xylylene diamines, methylene dianilines, diphenylether diamines and other aromatic polyamines as stated above), alicyclic diamines (such as isophorone diamine, cyclohexylene diamines, dicyclohexylmethane diamines and the like); and heterocyclic polyamines, such as piperazine, N-aminoethylpiperazine, and other heterocyclic polyamines, written in JPN Patent Publication No. 21044/1980.

Two or more of these active hydrogen atom-containing compounds may also be used in conjunction.

Among these active hydrogen atom-containing compounds, preferred are polyhydric alcohols. Among polyhydric alcohols, preferred are ethylene glycol, propylene glycol, glycerol, trimethylol propane, hexane triol, pentaerythritol, methylglucoside, sorbitol and sucrose.

Suitable alkylene oxides employed for producing polyether polyols, include, for example, ethylene oxide (hereinafter referred to as EO), propylene oxide (hereinafter referred to as PO), 1,2- 2,3-, 1,3- and 1,4-butylene oxides, styrene oxide, epichlorohydrin and the like, as well as combinations of two or more of them (block and/or random addition). Among these alkylene oxides, preferred are combination of EO and other alkylene oxides (herein-after referred to as AO). Among AO used in combination with EO, PO and combination thereof with smaller amount (for instance up to 5% based on the total weight of the alkylene oxides ) of other AO (such as butylene oxides, styrene oxide). Addition of alkylene oxides to active hydrogen atom-containing compounds can be carried out in the usual way, with or without catalysts[such as alkaline catalysts, amine catalysts and acidic catalysts], under normal or elevated pressure, in a single step or multi-stages. Addition of different AO [PO and EO] may be performed by random-addition, block-addition or combination of them [for instance, random-addition followed by block-addition].

In preferable polyether polyols containing polyoxyethylene chain, the content of the polyoxyethylene chain (hereinafter referred to as EO content) is usually at least 5% by weight, preferably 7-50%, more preferably 10-40%, in view of reactivity, curing characteristics, initial physical properties, compatibility and uniform reaction with isocyanates, and moldability and workability in RIM process. There may be used polyether polyols of EO content less than 5% in combination with ones of EO content more than 5%, or ones of EO content more than 50% in combination with ones of EO content less than 50%, so as to provide an average EO content within the above range.

Polyether polyols containing polyoxyethylene chain include, for example, ones obtained by adding EO and AO to active hydrogen atom-containing compounds as follows: block adducts, such as (1) adding AO followed by EO (tipped), (2) adding AO-EO-AO-EO in this order (balanced), (3) adding EO-AO-EO in this order, and (4) adding AO-EO-AO in this order (activated secondary); random adducts, such as (5) mixed-adding EO/AO; and random/block adducts, such as (6) adding AO-EO/AO-optionally AO-EO in this order, as written in JPN Lay-open Pat. 209920/1982, and (7) add-ing EO/AO followed by EO, as described in JPN Lay-open Pat. No. 13700/1978. (In the above, EO/PO means a mixture of EO and PO). Among these, preferred are those containing at least a part of the polyoxyethylene chain in as terminal blocks, particularly (1) and (2). Terminal EO content of them is generally at least 5%, preferably at least 7%, more preferably 7-30%. Internal EO content is usually 50% or less, preferably 10-40%. Primary hydroxyl content of these polyether polyols is usually at least 20%, preferably at least 30%, more preferably at least 50%, most preferably at least 70%.

Suitable polyester polyols are inclusive of condensation products of di- and/or tri-hydric alcohols (such as ethylene glycol, propylene glycol, 1,3- and 1,4-butane diols, 1,6-hexane diol, neopentyl glycol, diethylene glycol, glycerol, trimethylolpropane and the like) and/or polyether polyols (such as those described above) with dicarboxylic acids (for example, aliphatic or aromatic dicarboxylic acids, such as glutaric, adipic, sebacic, fumaric, maleic, phthalic and terephthalic acids) or ester-forming derivatives thereof (anhydrides and lower alkyl esters, such as maleic and phthalic anhydrides, dimethyl terephthalate, and the like); ring-opening polymerization products of lactones (such as epsilon-caprolactone).

Instead of or in combination with these polyols (polyether polyols and/or polyester polyols), modified polyols, for example, urethane-modified polyols (OH-terminated urethane prepolymers) prepared from organic polyisocyanates and excess of these polyols, polyols containing polymerizable unsaturated bonds in the molecules (such as maleic anhydride-modified polyols), and polymer/polyols, previously prepared by polymerizing one or more monomers (such as those described below) in situ in these polyols, may also be employed for producing polymer/polyol compositions in accordance with this invention.

Among these, preferred are polyether polyols.

These polyols (polyether polyols or other high molecular weight polyols), used for producing polymer/polyol compositions according to the invention, have usually 2–8 hydroxyl groups, preferably 2.3–4 hydroxyl groups (average). Hydroxyl number (hereinafter referred to as OHV) of these polyols is usually 200 or less, preferably 15–100. Polyols having OHV more than 200 result in high rigid and brittle polyurethanes. Molecular weight of these polyols is usually 2000–30,000 or higher, preferably 3000–25,000, in view of moldability and elasticity of the resulting polyurethanes.

These polyols (polyether polyols or other high molecular weight polyols) can be used as a mixture of those having different OHV, for instance, a mixture of a major amount (usually at least 50% by weight) of those having OHV of 70 or less and those having OHV of 80–500. These polyols may also be used in combination with a minor amount (for example, 20% by weight or less, particularly 5% or less) of low molecular weight polyols having high OHV (such as 700 or more). Examples of such low molecular weight polyols include polyhydric alcohols, as mentioned above as the raw materials for polyether polyols, as well as low mole alkylene oxide (such as EO and/or PO) adducts of active hydrogen atom-containing compounds (such as polyhydric alcohols, amines and so on, as described above).

Examples of suitable ethylenically unsaturated monomers, usable for producing polymer/polyol compositions in accordance with this invention, include the followings:

(1) ethylenically unsaturated nitriles: such as (meth)acrylonitrile [acrylonitrile and methacrylonitrile; similar expressions are used hereinafter].

(2) ethylenically unsaturated carboxylic acids, and derivatives of them: including unsaturated mono- and poly-carboxylic acids, such as (meth)acrylic, crotonic, maleic, fumaric, itaconic, citraconic, mesaconic, methyl-malonic, aconitic, alpha-ethoxy-acrylic, alpha-amino-acrylic, cinnamic and vinyl benzoic acids; anhydrides of these acids, such as maleic anhydride; esters of these acids with one or more hydroxyl compounds [for example, $C_1$–$C_{20}$ aliphatic, alicyclic or araliphatic monohydric alcohols, such as methanol, ethanol, n- and iso-propanols, butanols, octanol, 2-ethyl-hexyl alcohol, isodecyl alcohol, cyclohexanol and benzyl alcohol; nitrogen atom-containing alcohols, such as dialkylamino-alcohols (such as di-methyl or ethyl ethanol amine); phenol and the like; $C_2$–$C_6$ alkylene glycols, such as ethylene glycol, propylene glycols, 1,3- and 1,4-butane diols, neopentyl glycol, 1,6-hexane diol and the like; and polyglycols (adducts of one or more alkylene oxides (such as EO, PO, butylene oxides, styrene oxide, epichlorohydrin, and combinations of two or more of them, random and/or block) to one or more active hydrogen atom-containing compounds, such as alcohols and glycols as mentioned above and initiators for polyether polyols described previously}, said adducts containing generally 1–20, preferably 1–10, more preferably 2–10 oxyalkylene units per mole], for example, methyl (meth)acrylates, isopropyl (meth)-acrylates, octyl (meth)acrylates, isodecyl (meth)-acrylates, cyclohexyl (meth)acrylates, benzyl (meth)-acrylates, vinyl (meth)acrylates, hydroxyethyl (meth)-acrylates, hydroxypropyl (meth)acrylates, polyoxy-alkylene (meth)-acrylates [such as polyoxyethylene (meth)acrylates, polyoxypropylene (meth)acrylates and polyoxyethylene-polyoxypropylene (meth)acrylates, represented by the formula: $CH_2=CR-COO(A-O)_nH$ (wherein R is H or methyl; A is ethylene and/or propylene group, or combination of them; and n is an integer of 2–20)], di-methylaminoethyl (meth)acrylates, t-butyl-aminoethyl (meth)acrylates, dimethyl maleate, dimethyl fumarate, dimethyl itaconate, monomethyl itaconate and the like; amides and substituted amides of these acids, such as (meth)acrylamides, N,N-dimethyl(meth)acrylamides, N-butyl(meth)acrylamides, N,N-dibenzyl(meth)acrylamides, (meth)acrylformamides, N-alkylol($C_1$–$C_4$)(meth)acrylamides [such as N-methylol (meth)acrylamide and N-ethylol(meth)-acrylamide], and the like.

(3) ethylenically unsaturated hydrocarbons: aliphatic hydrocarbon monomers, such as ethylene, propylene, iso-butylene, butadiene, isoprene, 1,4-pentadiene, 1,6-hexadiene, 1,7-octadiene, and the like; aromatic hydrocarbon monomers, such as styrene, alphamethylstyrene, methylstyrene, (vinyltoluenes), 2,4-dimethyl-styrene, ethylstyrenes, isopropylstyrenes, butylstyrenes, phenylstyrenes, cyclohexylstyrenes, benzylstyrenes, divinylstyrenes and vinylnaphthalenes;

(4) other ethylenically unsaturated monomers: substituted styrenes, such as cyano-styrenes, nitrostyrenes, N,N-dimethylaminostyrenes, acetoxystyrenes, phenoxystyrenes, methyl 4-vinylbenzoate, p-vinyl diphenyl sulfide, p-vinylphenyl phenyl oxide, chlorostyrenes, 2,5-dichlorostyrene, bromostyrenes, fluorostyrenes, trifluoromethylstyrenes and iodostyrenes; substituted acrylic monomers, such as methyl alphachloroacrylate, ethyl alpha-ethoxy-acrylate, methyl alpha-acetamidoacrylate, alpha-chloro-acrylonitrile; vinyl esters, such as vinyl acetate, vinyl chloroacetate, vinyl propionate, vinyl butyrate, isopropenyl acetate, vinyl formate, vinyl (meth)acrylates, vinyl methoxyacetate, vinyl benzoate; vinyl ethers, such as vinyl methyl ether, vinyl ethyl ether, vinyl propyl ether, vinyl butyl ether, vinyl 2-ethylhexyl ether, vinyl phenyl ether, vinyl 2-methoxyethyl ether, methoxy-butadiene, vinyl 2-butoxyethyl ether, 2-butoxy-2′-vinyloxy diethyl ether, vinyl 2-ethylmercaptoethyl ether; hetero-ring-containing monomers, such as N-vinylpyrrolidone, N-vinyl pyrrole, vinylimidazole, vinyl pyridines and 3,4-dihydro-1,2-pyran; halogen-containing vinyl monomers, such as vinyl chloride, vinyl iodide, vinyl bromide, vinyl fluoride, vinylidene chloride, vinylidene iodide, vinylidene bromide, vinylidene fluoride, dichlorobutadiene and 1-chloro-1-fluoroethylene; vinyl ketones, such as vinyl methyl ketone, vinyl ethyl ketone, vinyl phenyl ketone; epoxy-containing ethylenically unsaturated monomers, as written in JPN Lay-open Patents No. 123523/1985 and No. 219209/1985, which correspond to U.S. Pat. No 4,524,165, such as glycidyl (meth)-acrylates; hydroxyl-containing monomers, as disclosed in JPN Patent Application No. 262132/1985, corresponding to U.S. Ser. No. 810,264, such as vinyl alcohol, (meth)allyl alcohols, crotyl alcohol, isocrotyl alcohol, butene mono-ols, butene diols, propargyl alcohol, and alkylene oxide adducts of them containing generally 1–20, preferably 1–10 oxyalkylene units per mole; and other monomers, such as vinyl ethylsulfide, vinyl ethyl sulfone, N-methyl-N-vinyl acetamide, divinyl sulfide, divinyl sulfoxide, divinyl sulfone, sodium vinyl sulfonate, methyl vinyl sulfonate, Among these monomers, preferred are unsaturated nitriles, unsaturated carboxylic acids [particularly (meth)acrylic and maleic acids] and derivatives thereof (especially anhydrides and esters), and hydrocarbon monomers (particularly aromatic hydrocarbons). More preferred are acrylonitrile, (meth)acrylates (such as methyl methacrylate), maleic acid and anhydride thereof, and styrene.

In producing polymer/polyol composition, in accordance with the present invention, the amount of said polyamine (2) is usually 0.5–60 parts, preferably 1–50 parts, more preferably 2–40 parts, per 100 parts of said polyol (1), in view of moldability and fowability, and physical properties of polyurethanes. (In the above and hereinafter, parts designate parts by weight.)

The amount of said monomers (3) is generally 0.5–50 parts or higher (for instance up to—250 parts), preferably 1–40 parts, more preferably 2–30 parts, per 100 parts of the total amount of said polyol (1) and polyamine (2). In case where a polymer polyol prepared beforehand is used as the starting polyol (1), the amount of the monomers in the above include that contained in the polymer portion of the polymer polyol.

Preparation of polymer/polyol compositions according to this invention can be carried out in the usual way, except polyamine being present in the polymerization mixture. For example, a blend of polyol (1) with polyamine (2) is used instead of polyol, in methods by polymerizing monomer in polyol in the presence of polymerization initiator (such as radical generators), as described in U.S. Pat. No. 3,383,351, JPN Patent Publication Nos. 24737/1964 and 47999/1972 and JPN Lay-open Pat. No. 15894/1975; or by grafting polymer, prepared from monomer before hand, to polyol in the presence of radical generator, as described in Japan Patent Publication No. 47591/1972. Preferred is the former method. Addition of polyamine (2) or blending of (2) with polyol (1) and monomer (3) may be performed in any order or at any stage of polymerization. There can be mentioned, for instance: methods by introducing (3) into a blend of (1) and (2); methods by introducing (3) and (2) simultaneously (either separately or blended beforehand) into (1); methods by introducing a part of (3) into (1) to polymerize them, followed by adding thereto (2) and the rest of (3) successively or simultaneously; methods by introducing a part of (3) into a blend of (2) and a part of (1) to polymerize them, followed by adding thereto the rest of (1) and introducing the rest of (3); and combinations of these methods.

Polymerization is usually carried out in the presence of polymerization initiators. Illustrative of suitable initiators are free radical generators, for example, azo compounds, such as 2,2'-azobisisobutyronitrile (hereinafter referred to as AIBN), 2,2'-azobis(2,4-dimethylvaleronitrile) (hereinafter referred to as AVN) and the like; peroxides, such as methyl isobutyl ketone peroxide, dibenzoyl peroxide, lauroyl peroxide, di-t-butyl peroxide, dicumyl peroxide, t-butyl hydroperoxide, di-iso-propyl peroxydicarbonate, t-butyl peroxyisopropylcarbonate, t-butyl peroxy(2-ethylhexanoate), t-butyl peroxy-pivalate, 2,5-dimethyl-hexane-2,5-diper-2-ethyl-hexoate, t-butyl percrotonate, t-butyl perisobutyrate, di-t-butyl perphthalate, 1,1-di-t-butyl peroxy-3,3,5-trimethyl-cyclohexane and the like; persulfates, perborates, persuccinates, and so on. Among these, preferred are azo compounds, especially AIBN and AVN, from a practical point of view. The amount of polymerization initiator is usually 0.05–20%, preferably 0.1–10%, more preferably 0.2–5%, based on the weight of monomer.

Free radical generation by physical methods, such as by ultraviolet-light irradiation and by electron beam irradiation, may also be employed.

Polymerization can be performed without any solvents, but it may be carried out in the presence of one or more solvents (particularly in case of producing polymer/polyol compositions of high polymer content). Suitable solvents include, for example, benzene, toluene, xylene, acetonitrile, ethyl acetate, hexane, heptane, dioxane, N,N-dimethylformamide, iso-propanol, n-butanol and the like.

Polymerization may also be carried out in the presence of known chain transfer agents other than alkyl mercaptans, if necessary. Illustrative of suitable chain transfer agents are carbon tetrachloride, carbon tetrabromide, chloroform, and enolethers as described in JPN Lay-open Pat. No. 31,880/1980.

Polymerization may be done continuously or batchwise. Polymerization is carried out at temperature above the decomposition temperature of the polymerization initiator, usually at 60°–180° C., preferably at 90°–160° C., more preferably at 100°–150° C., under atmospheric pressure, under pressure or under reduced pressure.

Polymer/polyol compositions obtained after polymerization may be used as raw materials for polyurethane, as such without any after-treatment; but it is desirable to remove impurities such as decomposition products of polymerization initiators, unreacted monomers, organic solvents and so on, by conventional means.

Polymer/polyol compositions thus obtained are translucent or opaque, white or brownish yellow dispersions, in which both polyamines and all the monomers polymerized (namely, polymers) are stably dispersed in polyols.

Polymer content of said polymer/polyol compositions is generally 0.5–35% or higher (for example, up to 70%), preferably 1–30%, more preferably 2–25%. Polymer content less than 1% results in too rapid reactivity and poor moldability.

OHV of polymer/polyol compositions is generally 10–500, preferably 20–400, more preferably 25–300 mgKOH/g. Amine value of polymer/polyol compositions is generally 2–300, preferably 2–200 mgKOH/g.

In producing polyurethanes from polymer/polyol composition (a), according to the present invention, one or more other active hydrogen atom-containing compounds may be used in conjunction, if desired. Such compounds include, for example, high molecular polyols (b) and low molecular weight active hydrogen atom containing compounds (c).

Illustrative of suitable high molecular weight polyols (b) are the same ones as described as the raw materials for polymer/polyol compositions, namely polyether polyols, polyester polyols, urethane-modified polyols, and vinyl-modified polyols or polymer/polyols; as well as polyols from natural oils such as castor oil, polybutadiene polyols and hydroxyl-containing vinyl polymers (such as acrylic polyols), as described in JPN Lay-open Patents No. 57413/1983 and No. 57414/1983, for instance. Such polyols usually contain 2–8 or more hydroxyl groups and have OH equivalent weight of 200–4000, preferably 2–4 hydroxyl groups and have OH equivalent weight of 400–3000. Among these polyols, preferred are polyether polyols, particularly polyoxyethylene chain-containing ones, which have preferably EO content of at least 5%, internal EO content of 0–50% and terminal EO content of 0–30%.

Examples of suitable low molecular weight active hydrogen atom-containing compounds (c) include compounds containing at least two (preferably 2–3, particularly 2) active hydrogen atoms (such as hydroxyl, amino and mercapto, preferably hydroxyl) and having a molecular weight of 500 or less (preferably 60–400) or an equivalent weight (molecular weight per active hydrogen atom-containing groups) of at least 30 and less than 200, which compounds are generally called chain-extenders or crosslinkers. Such compounds include, for instance, low molecular weight polyols and aminoalcohols. Illustrative examples of such polyols are dihydric alcohols, such as ethylene glycol, diethylene glycol, propylene glycols, dipropylene glycol, 1,3- and 1,4-butane diols, neopentyl glycol and 1,6-hexane diol; alcohols containing three or more hydroxyl groups, such as glycerol, trimethylol propane, pentaerythritol, diglycerol, alpha-methylglucoside, sorbitol, xylitol, mannitol, dipentaerythritol, glucose, fructose, sucrose and the like; polyhydroxyl compounds having equivalent weight of less than 200, obtain-able by adding smaller amounts of one or more alkylene oxides (such as EO and/or PO) to active hydrogen atom-containing compounds (such as polyhydric alcohols as mentioned above), for example polyethylene glycols and polypropylene glycols; cyclic group-containing diols, as disclosed in JPN Patent Publication No. 1474/1970 [for example, alkylene oxide (such as EO and/or PO) adducts of polyhydric phenols (such as bisphenol A, hydroquinone and the like]; tertiary or quaternary nitrogen atom-containing polyols [for instance, those as written in JPN Lay-open Pat. No. 130699/1979 N-alkyldialkanol amines (such as N-methyldiethanol amine, N-butyldiethanol amine and the like and quaternarized products of these amines), and trialkanol amines (such as triethanol amine, tripropanol amines and the like)]; and sulfur-containing polyols, such as thiodiglycol. Suitable aminoalcohols include, for example, mono- and dialkanolamines, such as mono- and di-ethanol amines and propanol amines. Among these, preferred are low molecular weight polyols (especially diols). More preferred are ethylene glycol, 1,4-butane diol, neopentyl glycol, 1,6-hexane diol, and mixtures of two or more of them.

Other high molecular weight polyols (b) and/or low molecular weight active hydrogen atom-containing compounds (c) may be added to raw materials (polyether polyols and or polyamines) of polymer/polyol compositions (a) according to this invention, during production of (a), or after production of (a).

In producing polyurethanes, using, as active-hydrogen atom-containing components, polymer/polyol compositions (a) according to this invention, with or without other high molecular weight polyols (b) and/or low molecular weight active hydrogen atom-containing compounds (c), the amount of (a) is usually at least 20%, preferably at least 50%, the amount of (b) is usually 0–70%, preferably 0–50%, and the amount of (c) is usually 0–30%, preferably 0–25%, based on the total weight of the active-hydrogen atom-containing components [(a) and optionally (b) and/or (c)]. Use of lower amount of (a) results in longer period of initial increase of viscosity and is liable to provide molded products containing voids caused by inclusion of air during flowing of the reaction mixture into the mold. Using larger amount of (c) causes high exotherm and demolding within too short period (such as 20 seconds or less), resulting in molded articles having a tendency to form few mark and blister in the vicinity of the inlet and being too rigid and brittle.

In producing polyurethanes according to the invention, there can be used any of organic polyisocyanates, conventionally employed for production of polyurethanes. Suitable polyisocyanates include aromatic polyisocyanates containing 6–20 carbon atoms (except carbon atoms in NCO groups), aliphatic polyisocyanates containing 2–18 carbon atoms, alicyclic polyisocyanates containing 4–15 carbon atoms, araliphatic polyisocyanates containing 8–15 carbon atoms, and modified polyisocyanates of these polyisocyanates containing urethane, carbodiimide, allophanate, urea, biuret, urethdione, urethonimine, isocyanurate and/or oxazolidone groups. Illustrative examples of polyisocyanates are: aromatic polyisocyanates, such as 1,3- and/or 1,4-phenyl-enediisocyanates, 2,4- and/or 2,6-tolylenediisocyanates (TDI), crude TDI, diphenylmethane-2,4'- and/or 4,4'-diiosycanates (MDI), crude MDI or polymethylene-polyphenylenepolyisocyanates (PAPI) obtained by phosgenation of crude diamino-diphenyl methane [condensation products of formaldehyde with aromatic amine (such as aniline) or a mixture thereof: mixtures of diamino-diphenyl methane and minor amount (such as 2–20%) of polyamine of 3 or higher functionality], naphthalene-1,5-diisocyanate, triphenylmethane-4,4',4''-triisocyanate, m- and p-isocyanato-phenyl sulfonyl isocyanate, and the like; aliphatic polyisocyanates, such as ethylenediisocyanate, tetramethylenediisocyanate, hexamethylenediisocyanate, dodecamethylenediisocyanate, 1,6,11-undecanediisocyanate, 2,2,4-trimethylhexanediisocyanate, lysine diisocyanate, 2,6-diisocyanato-methyl caproate, bis(2-isocyanato-ethyl fumarate, bis(2-isocyanato-ethyl) carbonate, 2-isocyanato-ethyl-2,6-diisocyanate-hexanoate, and the like; alicyclic polyisocyanates, such as isophorone diisocyanate, dicyclohexylmethane diisocyanates (hydrogenated MDI), cyclohexylene diisocyanates, methylcyclohexylene diisocyanates (hydrogenated TDI), bis(2-isocyanato-ethyl) 4-cyclohexene-1,2-dicarboxylate, and the like; araliphatic polyisocyanates, such as xylylene diisocyanates, diethyl-benzene diisocyanates, and the like; and modified polyisocyanates, such as urethane-modified TDI, carbodiimide-modified MDI, urethane-modified MDI, trihydrocarbyl phosphate-modified MDI, and the like; as well as mixtures of two or more of them, such as combination of modified MDI with urethane-modified TDI (isocyanate-terminated prepolymer). Examples of suitable polyols, used for producing urethane-modified polyisocyanates (isocyanate-terminated prepolymer obtained a polyol with excess polyisocyanate (such as TDI, MDI), include polyols having equivalent weight of 30–200, for example, glycols, such as ethylene glycol, propylene glycol, diethylene glycol and dipropylene glycol; triols, such as trimethylol propane and glycerol, polyols of higher functionality, such as pentaerythritol and sorbitol; and alkylene oxide (EO and/or PO) adducts of them. Among these, preferred are those having a functionality of 2–3. Free isocyanate-content of these modified polyisocyanates and prepolymers are generally 8–33%, preferably 10–30%, more preferably 12–29%. Among these polyisocyantes, preferred are aromatic polyisocyanates and modified ones therefrom. More preferred are TDI (including 2,4- and 2,6-isomers, mixtures of them and crude TDI) and MDI (including 4,4'- and 2,4'-isomers, mixtures of them and curde MDI or PAPI), and modified polyisocyanates containing urethane, carbodiimide, allophanate, urea, biuret and/or isocyanurate groups, derived from these polyisocyanates (TDI and/or MDI). The most preferred are modified MDI, such as Corronate C-1059 and C-1050, produced by Japan Polyurethane Co., Isonate 160L and 181, produced by Kasei-Up John Co. and Sumidur PC and PF, produced by Sumitomo-Bayer Urethane Co.

Polyurethanes, produced from polymer/polyol compositions, in accordance with the present invention, include foamed or cellular ones (foams), and non-cellular ones (such as elastomers, sheet materials and so on).

In producing polyurethanes foams, foaming can be attained by using blowing agents, or by introducing gases, such as air (air loading), or combination of them. Examples of suitable blowing agents are reactive blowing agents, such as water, which generates carbon dioxide by reaction with polyisocyanate, and the like; and volatile blowing agents, for example, halogen-substituted aliphatic hydrocarbons, such as methylene chloride, chloroform, ethylidene dichloride, vinylidene chloride, trichlorofluoromethane, dichlorofluoromethane and the like; low-boiling hydrocarbons, such as butane, hexane, heptane and the like; and volatile organic solvents without halogen, such as acetone, ethyl acetate, diethylether and the like; as well as combinations of two or more of them. Among these, preferred are halogen-substituted aliphatic hydrocarbons (particularly freons, such as such as methylene chloride and trichlorofluoromethane), water and combinations of them. The amount of blowing agents can be varied according to the desired density of polyurethanes, which may vary widely, for instance, from 0.01 to 1.4 g/cm$^3$. It is desirable to use such agents in such an amount to provide polyurethanes (foams) having overall density of at least 0.3 g/cm$^3$, preferably at least 0.6 g/cm$^3$, particularly 0.8–1.2 g/cm$^3$, in view of self-mold-release ability of molded products. The amount of water is preferably at most 0.4%, more preferably at most 0.2%, based on the weight of active hydrogen atom-containing compounds [(a), and optionally (b) and/or (c)]. Over-use of water results in spoiling appearance of molded articles with formation of carbon dioxide gas bubble on the surface and in increase of rigidity and brittleness (especially at lower temperature) by increase of urea linkages. The amount of volatile blowing agents is generally 30% or less, preferably 2–20%, based on the weight of active hydrogen atom-containing compounds [(a), and optionally (b) and/or (c)], in case where no water is used; and the amount becomes somewhat lower in case of using water: for example, generally 20% or less, preferably 15% or less, when 0.4% of water is used. In carrying out air loading, it is desirable to introduce gas in such an amount of at least 10%, preferably 10–40%, as to specific gravity of raw materials for resins.

In producing polyurethanes, according to this invention, organic polyisocyanates and active hydrogen atom-containing components [(a), and optionally (b) and/or (c) and/or water] are reacted in such an amount to provide NCO index of usually 95–120, preferably 100–115, more preferably 100–105. Furthermore, drastically higher NCO index than the above-mentioned range, for instance 120–5000 or more, preferably 150–1000, more preferably 200–500 may be employed to introduce isocyanurate linkages into polyisocyanurates (resins or foams).

In producing polyurethanes according to this invention, there may be used, if necessary, any known materials, such as catalysts, and other auxiliaries, usually employed in producing polyurethanes.

Examples of suitable catalysts are amine catalysts, including tertiary amines, secondary amines, alkanolamines and quaternary ammonium hydroxides, for example, triethylamine, tributylamine, N-methylmorpholine, N-ethylmorpholine, N,N,N',N'-tetramethylethylenediamine, pentamethyldiethylenetriamine, triethylenendiamine, N-methyl-N'-dimethylaminoethylpiperazine, N,N-dimethylbenzylamine, N,N-dimethylcyclohexylamine, N,N,N',N'-tetramethyl-1,3-butanediamine, 1,2-dimethylimidazole, dimethylamine, N-methyldiethanolamine, N-ethyldiethanolamine, N,N-dimethylethanolamine, N,N-diethylethanolamine, tetraalkylammonium hydroxides (such as tetramethylammonium hydroxide), aralkyltrialkylammonium hydroxides (such as benzyltrimethylammonium hydroxide), diazabicycloalkenes as disclosed in U.S. Pat. No. 4,524,104 (such as DBU), and the like; alkaline catalysts, including phenoxides, hydroxides, alkoxides and carboxylates of alkali metals (such as sodium and potassium), for example, sodium phenolate, potassium hydroxide, sodium methoxide, potassium acetate, sodium acetate, potassium 2-ethylhexanoate and the like; phosphines, such as triethylphosphine; metal chelate compounds, such as potassium-salicylaldehyde complex; organotin compounds, including $Sn^{II}$ and $Sn^{IV}$ compounds, such as stannous acetate, stannous octoate (stannous 2-ethylhexoate), dibutyltin oxide, dibutyltin dichloride, dibutyltin diacetate, dibutyltin dilaurate, dibutyltin maleate, dioctyltin diacetate and the like; other organo metal compounds, such as di-alkyl titanate, lead naphthenate, and so on. Catalysts for trimerization of NCO groups forming isocyanurate ring, such as tris(dimethylaminomethyl)phenol, N,N',N"-tris(dimethylaminopropyl)hexahydro-s-triazine and the like, may also be used. These catalysts are used in small amounts, for instance, from about 0.001 to about 5% based on the weight of the reaction mixture.

Exemplary of other auxiliaries are surfactants, as emulsifiers and foam stabilizers, particularly silicone surfactants (polysiloxane-polyoxyalkylene copolymers) being important. Illustrative of other known additives are flame retardants (such as phosphorus compounds, halogen compounds, $Sb_2O_3$ and the like), retarders (such as acidic compounds), colorants (pigments and dyes), internal mold release agents (such as hydrocarbon waxes and silicone compounds), age resistors, antioxidants (such as hindered phenols), plasticizers, solvents, thixotropants (such as colloidal silica), germicides, fillers (such as carbon black, titanium dioxide, diatomaceous earth, glass fiber, shattered glass fiber, talc, mica, silica, sand, aluminum powder, graphite, asbestos, and the like), and so on.

Polyurethanes of the present invention can be produced in known manners, including one-shot process, semi-prepolymer process and prepolymer process. There may be used any known mixing or foaming machines usually employed in producing polyurethanes. In case where no solvent is used, mixing machines, such as kneaders and extruders, can be used. Production of various non-cellular or cellular polyurethanes may be carried out in closed mold or open mold, usually by mixing raw materials with low pressure or high pressure mixing machines. Other methods, such as spray method, may also be used. It is preferred to produce polyurethanes by mixing and reacting using high pressure machines. Furthermore, polyurethanes may also be produced under vacuum to eliminate gases, such as air dissolved or mingled in raw materials, before and/or after mixing (particularly before mixing) of the raw materials.

This invention is particularly useful for non-cellular or microcellular polyurethane elastomers having a density of 0.8–1.4 g/cm$^3$, especially 0.95–1.4 g/cm$^3$, by RIM method, which elastomers may be hereinafter referred to as RIM urethanes. Molding by RIM method can be carried out in the same conditions as conventional RIM method. For instance, Component A is prepared by mixing uniformly active hydrogen atom-containing compounds [(a) and optionally (b) and/or (c)[ and optionally other additives (catalysts, surfactants and/or other additives), and then optionally adding thereto blowing agents (water and/or volatile blowing agents) or air loading. As Component B, is used polyisocyanate. These Components A and B are charged in the tanks A and B of the high pressure foaming machine. Components A and B are mixed in the mixing head and introduced into the mold, via the injection nozzle attached to the mold beforehand. Molding conditions may be the same as those in the known RIM methods. For example, the raw materials (2–4 components), conditioned at a temperature of 25°–90° C., are intimately mixed in an impingement mixhead under a pressure of 100–200 Kg/cm$^2$G and then injected into a closed mold preheated to a temperature of 30°–200° C. (preferably 60°–90° C.), followed by demolding within 0.1–5 minutes. After demolding, molded articles thus obtained may be further after-cured or annealed. Annealing can be carried out, for instance, for 0.3–100 hours at 60°–180° C. (preferably 80°–160° C., more preferably 100°–150° C.), particularly for 1–30 hours at 120°–140° C.

The invention is also useful for producing high-resilient and firm, flexible and semi-rigid polyurethane foams, suitable for energy absorbers, or cushioning materials of automobiles, furnitures and so on, and for producing cellular and non-cellular rigid polyurethanes, as well as for producing polyurethanes suitable for adhesives, coatings and the like.

Polymer/polyol compositions, prepared by polymerizing monomers in situ in polyols and polyamines, in accordance with the present invention, have high reactivity with polyisocyanates and suitable for producing polyurethanes, and can provide, by reaction with a polyisocyanate, polyurethanes having improved moldability, initial strength and physical properties along with self-mold-release characteristics.

In addition, painted polyurethane products, obtained from polymer/polyol compositions according to the invention, have no or little tendency of paint color to discolor with time, which tendency is frequently observed in those products from conventional polymer polyols using larger amounts of catalyst in order to shorten curing time.

By applying polymer/polyol compositions according to this invention to RIM process, there can be attained effects as follows:

(1) Cycle time from injection to demolding is remarkably shortened, because of high reactivity.

(2) Initial increase of viscosity (viscosity increase to such extent to maintain sufficient flowability) is attained within short period of time, and formation of voids caused by inclusion of air can be avoided.

(3) Reaction mixture is introduced into mold with enough viscosity, and cured without invading into fine cracks or pores on inner surface of the mold; and, as the results, the molded products have lower adhesion to mold surface and can be demolded easily, and self-mold-release characteristics is attained, such that, by only one time spraying of external release agent onto the mold surface, generally at least 5 times (especially 10–20 times) of continuous demolding without applying release agent any more.

(4) Reaction mixture have enough flowability to reach every part in the mold cavity and can provide uniform molded articles free from spoiled appearance, such as short molding, collapse or recess; while, in conventional RIM process, as polyamines (particularly aromatic ones) are too reactive and the reaction thereof with isocyanate occurs prior to the reaction of polyol with isocyanate, it is liable to result in short molding, collapse or recess, or else products of uneven density distribution. Thus, polyurethanes formed from polymer/polyol compositions according to this invention are particularly useful as exterior automotive trim, such as bumpers, fenders, door panels, trunk lid and outer bodies, and as housing of electrical apparatus or appliances.

Having generally described the invention, a more complete understanding can be obtained by reference to certain specific examples, which are included for purposes of illustration only and are not intended to be limiting unless otherwise specified.

Raw materials used in the following examples are as follows:

(1) Polyols:

Polyol A: a dihydric polyether polyol (OHV: 28), produced by addition of 3,124 parts of PO to 76 parts of propylene glycol, followed by tipping 800 parts of EO.

Polyol B: a dihydric polyether polyol (OHV: 28), produced by successive addition of 2,724 parts of PO, 400 parts of EO, 400 parts of PO and then 400 parts of EO to 76 parts of propylene glycol.

Polyol C: a trihydric polyether polyol (OHV: 28), produced by addition of 4,708 parts of PO to 92 parts of glycerol, followed by tipping 1,200 parts of EO.

Polyol D: a trihydric polyether polyol (OHV: 24), produced by successive addition of 1,658 parts by PO, and then a mixture of 3,150 parts of PO and 1,050 parts of EO to 92 parts of glycerol, followed by tipping 1,050 parts of EO.

Polyol E: a octahydric polyether polyol (OHV: 28), produced by addition of 12,458 parts of PO to 342 parts of sucrose, followed by tipping 3,200 parts of EO.

(2) polyamines:

DETDA: 1-methyl-3,5-diethyl-2,4-/2,6-diaminobenzene.

TDA: 2,4-/2,6-diaminobenzene.

PDA: 1,4-phenylene diamine.

CPDA: 2-chlorophenylene diamine.

(3) Ethylenically unsaturated monomers:

MMA: methyl methacrylate.

ST: styrene.

MA: maleic anhydride.

AN: acrylonitrile.

IDM: isodecyl methacrylate.

AA: acrylic acid.

(4) Low molecular weight polyol:

EG: ethylene glycol.

(5) Polyisocyanate:

Modified MDI: a carbodiimide-modified liquid MDI (NCO content: 26%)

(6) Catalysts:

DBTDL: dibutyltin dilaurate.

DABCO33LV: 33% solution of triethylene diamine in dipropylene glycol, produced by Sankyo Aeroproducts, Ltd.

(7) Black toner:

A toner prepared by incorporating carbon black and stabilizers (a mixture of a UV absorber, an antioxidant and a heat-resistance improver) in a polyethyl polyol.

(8) Mold release agent:

Mold release D-186: an external mold release agent, produced by Chukyo Oil & Fat, Ltd.

EXAMPLE I

Into an autoclave equipped with a stirrer and temperature control means, were charged 90 parts of Polyol A and 10 parts of DETDA, and heated to 130° C. under stirring. Then 10 parts of MMA and 1.0 parts of AIBN were continuously fed by pump over 2 hours, while maintaining the temperature at about 130° C., followed by stirring for additional 30 minutes at the same temperature. Finally, volatile matters were removed under reduced pressure to obtain a pale brown finely dispersed polymer/polyol composition (Polyol I), having an apparent OHV (the total of OHV and Primary Amine Value, hereinafter referred to as OHV+AmV) of 56.9.

EXAMPLES II TO VI

By the same manner as in Example I, various polymer/polyol compositions (Polyols II to VI) were prepared from the raw materials and at polymerization temperature, as written in Table 1.

Injection pressure: 160–150 Kg/cm²G (both the components)
Injection time: about 2.0 sec.
Isocyanate index: 107
Air loading: about 10–20%

After demolding followed by annealing for 30 minutes at 120° C., physical properties of the resulting articles were measured.

Demold time, initial strength, self mold-release characteristics, moldability and physical properties of polyurethanes were measured as follows; and the results are shown in Tables 2 and 3.

(1) Demold time: period of time (sec.) from starting of injecting reaction mixture into the mold up to demolding.

(2) Initial strength: period of time (sec.) from starting of injection until the time when the molded product become not be cracked by folding extremities of the product to angle at 180.

(3) Self mold-release characteristics: the number of times capable of demolding continuously without applying external mold release agent, after one time application of the mold release agent.

Figure 1:
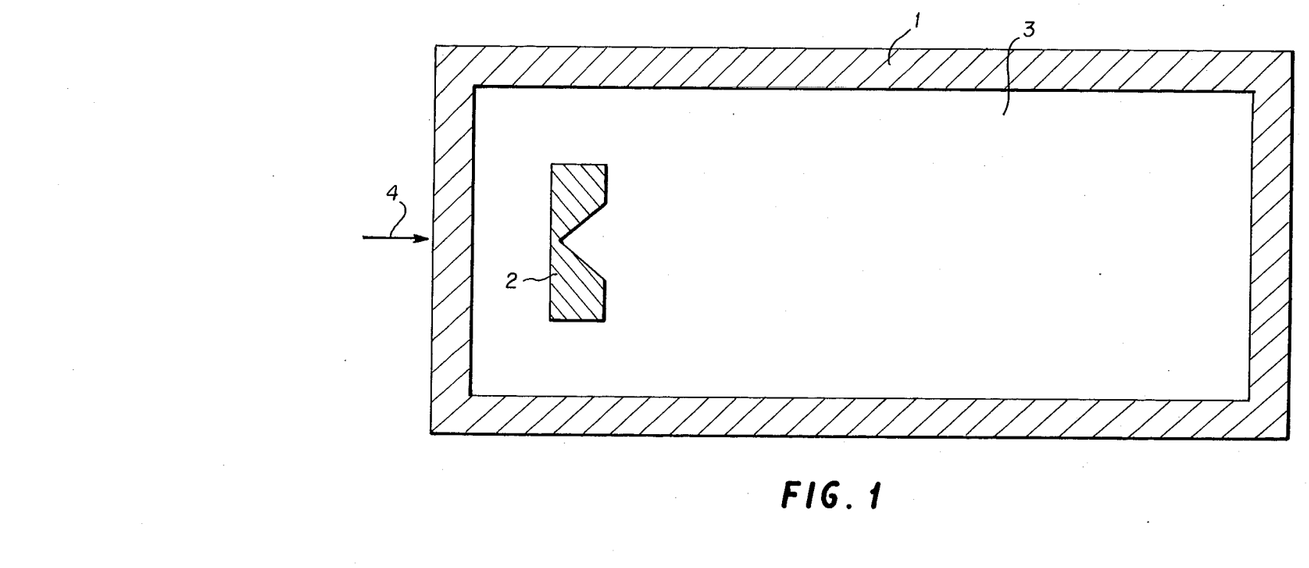
FIG. 1 is a cross sectional view of a planar mold, having a hindrance plate, attached thereto within the mold cavity. The mold is used for testing moldability, as described in the examples hereinafter.

(4) Moldability: the occurrence of void, weld, and flow mark or blister, observed for products molded withiin a poor flowability mold, as shown in FIG. 1, that is a planar mold (1) [1,000 mm×400 mm×2.5 mm(thickness)], having a hindrance plate (2), attached thereto within the mold cavity (3) in the position at 10 cm' distance from the inlet, as shown in FIG. 1, standing in the way of the injected reaction mixture [which is

TABLE 1

| Example | I | II | III | IV | V | VI |
|---|---|---|---|---|---|---|
| Polyol | A | B | C | D | E | C |
| Polyol, parts | 90 | 90 | 98 | 92 | 96 | 80 |
| Polyamine | DETDA | TDA | TDA | PDA | CPDA | DETDA |
| Polyamine, parts | 10 | 10 | 2 | 8 | 4 | 20 |
| MMA, parts | 10 | | | | | |
| ST, parts | | 8 | | | 5 | 5 |
| MA, parts | | 2 | | | | 2 |
| AN, parts | | | 3 | | | 5 |
| IDM, parts | | | | 5 | | |
| AA, parts | | | | 1 | | |
| AIBN, parts | 1.0 | 1.0 | 0.5 | 1.0 | 1.0 | 1.0 |
| Temp. °C. °C. | 130 | 130 | 130 | 130 | 120 | 130 |
| Polyol | I | II | III | IV | V | VI |
| OHV + AmV | 56.9 | 106 | 44.8 | 99.8 | 56.1 | 133.1 |

EXAMPLES 1 TO 8, AND COMPARATIVE EXAMPLES 1 TO 3

Into raw material tanks A and B of a high pressure foaming machine, were charged, respectively, Component A, comprising active hydrogen atom-containing compounds as written in Tables 2 and 3, and Component B comprising Modified MDI. Under the following molding conditions, Components A and B were mixed vigorously with the high pressure foaming machine, and introduced into a temperature controllable planar mold [1,000 mm×400 mm×2.5 mm(thickness)] to obtain high-density polyurethane articles.

[Molding conditions]

Material temperature: about 30°–45° C. (both the components)
Mold temperature: about 50°–70° C.
Delivery rate: about 50 Kg/minute introduced in the direction of (4) in FIG. 1], said plate being 200 mm×70 mm×3 mm (thickness) in size and having a triangular cut (an isosceles triangle measuring 100 mm in base and 60 mm in height); and the occurrence of depression, observed for molded products having a density of about 1.05 g/cm³, obtained by 5% over-packing.

judgement of moldability:
A: No occurrence.
B: Slightly occurred.
C: Remarkably occurred.

(5) Physical properties:

Overall density, g/cm³: Substitution in Water
Tensile strength, Kg/cm²: JIS K-6301, dumbbell No. 3
Elongation, %: JIS K-6301, dumbbell No. 3
Flexural modulus, Kg/cm²: JIS K-7203
  sample: 25 mm×125 mm×2.5 mm;
  span: 40 mm; loading nose: 5R;
  cross head speed: 10 mm/min.;
  chart speed: 200 mm/min.

Heat sag, mm: the distance dropped by heating at 25 mm×125 mm×2.5 mm sample in the state of 100 mm overhanging to 120° C. for 1 hour and then allowing to stand at room temperature for 30 minutes.

Embrittle temperature, °C.: JIS K-6301.

TABLE 2

|  | Example | | | Comparative Example | |
|---|---|---|---|---|---|
|  | 1 | 2 | 3 | 1 | 2 |
| Formulation of Component A, parts | | | | | |
| Polyol | I | IV | VI | — | — |
|  | 90 | 90 | 90 | | |
| Polyol | — | — | — | A | A |
| Black toner | 10 | 10 | 10 | 10 | 10 |
| EG | 5 | 6 | — | 17 | — |
| DETDA | — | — | — | — | 22 |
| DBTDL | 0.10 | 0.10 | 0.10 | 0.10 | 0.10 |
| Demold time | 20 | 20 | 20 | 60 | 20 |
| Intial strength | <15 | <15 | <15 | <60 | <15 |
| Self mold-release characteristics | 18 | 16 | >20 | 5 | >15 |
| Moldability | | | | | |
| Void | A | A | A | A | C |
| Weld | A | A | A | C | A |
| Flow mark | A | A | A | A | A |
| Depression | A | A | A | A | A |
| Physical properties | | | | | |
| Overall density | 1.08 | 1.07 | 1.06 | 1.07 | 1.08 |
| Tensile strenth | 240 | 228 | 248 | 206 | 218 |
| Elongation | 330 | 310 | 340 | 260 | 320 |
| Flexural modulus | 2100 | 2150 | 2300 | 1910 | 2200 |
| Heat Sag | 14.3 | 13.0 | 10.8 | 18.8 | 12.8 |
| Embrittle temp. | −46 | −45 | −43 | −42 | −46 |

TABLE 3

|  | Example | | | | | Comparative Example 3 |
|---|---|---|---|---|---|---|
|  | 4 | 5 | 6 | 7 | 8 | |
| Formulation of Component A, parts | | | | | | |
| Polyol | II | III | V | IV | VI | — |
|  | 90 | 90 | 90 | 50 | 20 | |
| Polyol | — | — | — | A | C | C |
|  | | | | 40 | 67 | 90 |
| Black toner | 10 | 10 | 10 | 10 | 10 | 10 |
| EG | 5 | 16 | 13 | 10 | 13 | 17 |
| DABC033LV | — | — | — | — | — | 1.8 |
| DBTDL | 0.05 | 0.05 | 0.05 | 0.05 | 0.05 | 0.03 |
| Demold time | 15 | 15 | 15 | 15 | 15 | 30 |
| Initial strength | <20 | <20 | <20 | <20 | <20 | 40 |
| Self mold-release characteristics | 14 | 10 | 13 | 12 | 12 | 6 |
| Moldability | | | | | | |
| Void | A | A | A | A | A | A |
| Weld | A | A | A | A | A | C |
| Flow mark | A | A | A | A | A | B |
| Depression | A | A | A | A | A | B |
| Physical properties | | | | | | |
| Overall density | 1.08 | 1.07 | 1.07 | 1.07 | 1.07 | 1.08 |
| Tensile strength | 245 | 215 | 220 | 222 | 219 | 220 |
| Elongation | 290 | 260 | 220 | 270 | 230 | 220 |
| Flexural modulus | 2400 | 2160 | 2220 | 2090 | 2160 | 2200 |
| Heat sag | 15.0 | 15.6 | 13.8 | 16.6 | 14.8 | 16.9 |
| Embrittle temp. | −45 | −43 | −43 | −43 | −46 | −42 |

What is claimed as new and desired to be secured by Letters Patent is:

1. A polymer/polyol composition, which is convertible by reaction with a polyisocyanate to a polyurethane, wherein the polymer of said composition is formed by polymerizing one or more ethylenically unsaturated monomers in situ in a blend of at least one polyol and at least one polyamine; said polyol comprising a polyol having a hydroxyl number of 15-100, selected from the group consisting of polyether polyols, polyester polyols, urethane-modified polyols, polyols containing polymerizable unsaturated bonds in the molecule, and polymer/polyols previously prepared in situ in any of these polyols; said polyamine being selected from the group consisting of aromatic polyamines, aliphatic polyamines, alicyclic polyamines, heterocyclic polyamines, araliphatic polyamines, polyamide polyamines, polyether polyamines and dicyandiamide; the amount of said polyamine being 0.5-60 parts by weight per 100 parts by weight of said polyol; and said polymer being present in an amount of 1-70% based on the weight of said composition.

2. The composition of claim 1, wherein said polyamine comprises at least one polyamine selected from aromatic polyamines represented by the following general formula (1), (2), (3) or (4):

wherein R represents H, an alkyl group, an electron attractive group, or combination of two or more of them; n is an integer of 1-3; X represents direct link, or a divalent group, selected from the group consisting of $C_1$-$C_{10}$ alkylene, —O—, —CO—, —CO—, —SO$_2$—, thio, polythio, seleno, polyseleno, telluro and polytelluro groups; m is 0 or positive integer; and Y represents a trivalent aliphatic hydrocarbon groups; wherein plural R may be the same or different.

3. The composition of claim 1, wherein said polyamine is at least one compound selected from the group consisting of those having one or more alkyl substituents on the aromatic nucleus, those free from any substituents on the aromatic nucleus, and those having one or more electron-attractive substituents on the aromatic nucleus.

4. The composition of claim 1, wherein said polyamine is selected from the group consisting of:
  (1) at least one aromatic polyamine having one or more alkyl substituents on the aromatic nucleus;
  (2) at least one aromatic polyamine free from any substituents on the aromatic nucleus;
  (3) a combination of (1) and (2); and
  (4) a combination of (1), (2) or (3) with at least one aromatic polyamine having one or more electron attractive substituents on the aromatic nucleus.

5. The composition of claim 1, wherein said polyamine comprises an aromatic diamine having at least one alkyl substituent in the ortho-position to one amino group and two alkyl substituents each containing 1 to 3 carbon atoms in the ortho-positions to the other amino groups.

6. The composition of claim 5, wherein said diamine is at least one compound selected from the group consisting of 3,5-diethyl-2,4-tolylenediamine, 3,5-diethyl-2,6-tolylenediamine, 1,3-diethyl-2,4-diaminobenzene, 2,4-diamino-mesitylene, 1,3,5-triethyl-2,6-diamino-benzene, 2,4-diaminotoluene, 2,6-diaminotoluene, 3,3',5,5'-tetraethyl-4,4'-di-aminodiphenylmethane, and 3,3',5,5'-tetraisopropyl-4,4'-diaminodiphenylmethane.

7. The composition of claim 5, wherein said diamine is 3,5-diethyl-2,4-tolylenediamine, 3,5-diethyl-2,6-tolylenediamine, or a mixture of them.

8. The composition of claim 1, wherein said polyol having a hydroxyl number of 15-100 is a polyether polyol.

9. The composition of claim 8, wherein said polyether polyol contains at least 5% by weight of polyoxyethylene units.

10. The composition of claim 1, wherein said monomer is at least one ethylenically unsaturated compound selected from the group consisting of nitriles, hydrocarbon monomers, carboxylic acids and derivatives thereof.

11. A process for producing a polymer/polyol composition, convertible by reaction with a polyisocyanate to a polyurethane, which comprises polymerizing one or more ethylenically unsaturated monomers in situ in a blend of at least one polyol and at least one polyamine; said polyol comprising a polyol having a hydroxyl number of 15-100; said polyamine being selected from the group consisting of aromatic polyamines, aliphatic polyamines, alicyclic polyamines, heterocyclic polyamines, araliphatic polyamines, polyamide polyamines, polyether polyamines and dicyandiamide; said polyamine being used in an amount of 0.5-60 parts by weight per 100 parts by weight of said polyol; and said monomers being used in an amount of 1-50 parts by weight per 100 parts by weight of the total of said polyol and said polyamine.

12. The process of claim 11, wherein said polyamine is selected from the group consisting of:
  (1) at least one aromatic polyamine having one or more alkyl substituents on the aromatic nucleus;
  (2) at least one aromatic polyamine free from any substituents on the aromatic nucleus;
  (3) a combination of (1) and (2); and
  (4) a combination of (1), (2) or (3) with at least one aromatic polyamine having one or more electron attractive substituents on the aromatic nucleus.

13. A process for producing a cellular or noncellular polyurethane, which comprises reacting a mixture comprising the polymer/polyol composition claimed in claim 1 and an organic polyisocyanate.

14. A process for producing a cellular or noncellular polyurethane, which comprises reacting a mixture comprising the polymer/polyol composition claimed in claim 4 and an organic polyisocyanate.

15. The process of claim 13, wherein said polyisocyanate is reacted with an active hydrogen atom-containing component comprising, based on the weight of said component,
  (i) at least 20% of said polymer/polyol composition;
  (ii) 0–70% of at least one other high molecular weight polyol, having equivalent weight of 200–4,000, selected from the group consisting of polyether polyols, polyester polyols and modified polyols; and
  (iii) 0–70% of at least one low molecular weight compound containing at least two active hydrogen atom-containing groups, said compound having equivalent weight of at least 30 and less than 200, selected from the group consisting of low molecular weight polyols and amines.

16. A polyurethane foam produced by the process of claim 13.

17. A polyurethane, having an overall density of at least 0.6 g/cm³, produced by the process of claim 13.

18. The process of claim 16, wherein polyurethane molded article is formed by reaction injection molding.

19. The process of claim 18, wherein polyurethane molded article is formed without applying each time an external mold-release agent.

20. A microcelular polyurethane produced by the process of claim 18.

* * * * *